United States Patent
Umino et al.

(10) Patent No.: US 11,414,567 B2
(45) Date of Patent: Aug. 16, 2022

(54) (METH)ACRYLOYL GROUP-CONTAINING ACRYLIC-MODIFIED ALKYD RESIN AND UNDERCOAT AGENT FOR INORGANIC-MATERIAL THIN FILM

(71) Applicant: DIC Corporation, Tokyo (JP)

(72) Inventors: Akio Umino, Ichihara (JP); Hirotake Fukuoka, Ichihara (JP)

(73) Assignee: DIC Corporation, Tokyo (JP)

( * ) Notice: Subject to any disclaimer, the term of this patent is extended or adjusted under 35 U.S.C. 154(b) by 312 days.

(21) Appl. No.: 16/480,477

(22) PCT Filed: Jan. 18, 2018

(86) PCT No.: PCT/JP2018/001340
§ 371 (c)(1),
(2) Date: Jul. 24, 2019

(87) PCT Pub. No.: WO2018/139329
PCT Pub. Date: Aug. 2, 2018

(65) Prior Publication Data
US 2020/0002571 A1    Jan. 2, 2020

(30) Foreign Application Priority Data
Jan. 25, 2017 (JP) ............................. JP2017-011188

(51) Int. Cl.
C09D 187/00 (2006.01)
C08G 81/02 (2006.01)
C09D 5/00 (2006.01)

(52) U.S. Cl.
CPC ....... C09D 187/005 (2013.01); C08G 81/027 (2013.01); C09D 5/00 (2013.01)

(58) Field of Classification Search
CPC ................................................ C09D 187/005
See application file for complete search history.

(56) References Cited

U.S. PATENT DOCUMENTS

| 4,273,690 A * | 6/1981 | Walus | C08F 299/06 525/7 |
|---|---|---|---|
| 2004/0013895 A1* | 1/2004 | Dean | C08G 18/755 428/515 |
| 2011/0014438 A1 | 1/2011 | Suwa et al. | |
| 2011/0217478 A1 | 9/2011 | De Waele et al. | |

FOREIGN PATENT DOCUMENTS

| CN | 101981139 A | 2/2011 | |
|---|---|---|---|
| JP | 61-287918 A | 12/1986 | |
| JP | 62-020566 A | 1/1987 | |
| JP | 02-155949 A | 6/1990 | |
| JP | 2012-505276 A | 3/2012 | |
| JP | 2014-080548 A | 5/2014 | |
| JP | 2015-013933 A | 1/2015 | |
| WO | 2004/009716 A1 | 1/2004 | |
| WO | WO-2015077677 A1 * | 5/2015 | ............... C08F 8/00 |

OTHER PUBLICATIONS

International Search Report dated Apr. 24, 2018, issued for PCT/JP2018/001340.
Office Action dated Jan. 21, 2021, issued for Chinese Patent Application No. 201880008388.6.

* cited by examiner

*Primary Examiner* — Michael F Pepitone
(74) *Attorney, Agent, or Firm* — Locke Lord LLP

(57) ABSTRACT

Provided are a resin material that is superior in coating appearance and adhesion to substrates and can be used not only under organic solvent-diluted conditions but also under aqueous solvent-diluted conditions; an undercoat agent for an inorganic-material thin film containing the same; and a molded body produced by using the undercoat agent for an inorganic-material thin film. Provided are a (meth)acryloyl group-containing acrylic-modified alkyd resin, an active-energy-ray-curable resin composition containing the same, the undercoat agent for an inorganic-material thin film, and a molded body produced by using the undercoat agent for an inorganic-material thin film.

15 Claims, No Drawings

(METH)ACRYLOYL GROUP-CONTAINING ACRYLIC-MODIFIED ALKYD RESIN AND UNDERCOAT AGENT FOR INORGANIC-MATERIAL THIN FILM

CROSS-REFERENCE TO RELATED APPLICATIONS

This application is a national stage application of International Application No. PCT/JP2018/001340, filed Jan. 18, 2018, which claims priority to Japanese Application No. 2017-011188, filed Jan. 25, 2017; each of the above-identified applications is incorporated by reference herein.

TECHNICAL FIELD

The present invention relates to a (meth)acryloyl group-containing acrylic-modified alkyd resin that is superior in coating appearance and adhesion to substrates and that is also capable of being made aqueous, an active-energy-ray-curable resin composition containing the same, an undercoat agent for an inorganic-material thin film, and a molded body produced by using the undercoat agent for an inorganic-material thin film.

BACKGROUND ART

In parts having metallic luster of car components, home electric appliances, cosmetic containers, and the like, a technique of forming a tin film of an inorganic material, such as aluminum, tin, and silicon dioxide, by vacuum deposition, sputtering, or other methods is widely used. In this technique, for the purpose of enhancing adhesion of a substrate to an inorganic-material thin film or of forming a smoother inorganic-material thin film to improve the design, an undercoat layer is generally provided between the substrate and the inorganic-material thin film.

Among the car components, in components for which high heat resistance, high impact resistance, and light weight are required, such as a reflecting mirror of an exterior lamp lens, widely used as the substrates are plastic substrates, such as bulk molding compounds (BMC), polyphenylene sulfide (PPS), an aluminum die cast (ALD), a polybutylene terephthalate (PBT)/polyethylene terephthalate (PET) alloy resin, polycarbonate (PC), an acrylonitrile-butadiene-styrene copolymer resin (ABS), and polycarbonate (PC) reinforced with glass fibers or other fillers. In addition, in car components, home electric appliances, and the like, there are parts obtained by combining two or more types of substrates, parts of a shape having complicated projections and recessed, and the like. Accordingly, the undercoat layer is required to be superior both in adhesion to various plastic substrates and adhesion to inorganic-material thin films. Furthermore, there has recently been an increased request to make a coating aqueous in all the fields of coating for the purpose of improving work environment and reducing burden on the environment, and the market of such undercoat agents for inorganic-material thin films has also required aqueous undercoat agents.

A known example of an undercoat agent for an inorganic-material thin film is an ultraviolet-ray-curable resin composition containing an alkyd resin and a (meth)acrylate monomer (see PTL 1). The resin composition disclosed in PTL 1 is characterized by superior adhesion to various substrates and superior heat resistance. However, PTL 1 does not address the request to make the composition aqueous and the composition has to be diluted in an aromatic hydrocarbon solvent, such as toluene or xylene, a ketone solvent, or an ester solvent prior to the use. Under such a situation, it has been required to develop an undercoat agent for an inorganic-material thin film that can be used not only under organic solvent-diluted conditions but also under aqueous solvent-diluted conditions.

CITATION LIST

Patent Literature

PTL 1: JP-A-2015-13933

SUMMARY OF INVENTION

Technical Problem

Accordingly, an object of the present invention is to provide a resin material that is superior in coating appearance and adhesion to substrates and that is also capable of being made aqueous, an undercoat agent for an inorganic-material thin film containing the same, and a molded body produced by using the undercoat agent for an inorganic-material thin film.

Solution to Problem

As a result of intensive and extensive studies to achieve the above object, the present inventors have found that an acrylic-modified alkyd resin having a (meth)acryloyl group in the resin structure is superior in coating appearance and adhesion to various substrates when used as an undercoat agent for an inorganic-material thin film, and is capable of not only being used under organic solvent-diluted conditions but also being made aqueous, thus completing the present invention.

Specifically, the present invention relates to a (meth) acryloyl group-containing acrylic-modified alkyd resin.

The present invention also relates to an active-energy-ray-curable resin composition including the (meth)acryloyl group-containing acrylic-modified alkyd resin.

The present invention also relates to an undercoat agent for an inorganic-material thin film including the active-energy-ray-curable resin composition.

The present invention also relates to a coating film including a product made from the undercoat agent for an inorganic-material thin film.

The present invention also relates to a molded body having an undercoat layer made from the undercoat agent for an inorganic-material thin film.

Advantageous Effects of Invention

The present invention can provide a (meth)acryloyl group-containing acrylic-modified alkyd resin that is superior in coating appearance and adhesion to substrates and that is also capable of being made aqueous, an active-energy-ray-curable resin composition containing the same, an undercoat agent for an inorganic-material thin film, and a molded body produced by using the undercoat agent for an inorganic-material thin film.

DESCRIPTION OF EMBODIMENTS

Specifically, the (meth)acryloyl group-containing acrylic-modified alkyd resin of the present invention is an alkyd resin having an acrylic polymer structural moiety and a (meth)acryloyl group in the resin structure, and a wide variety of such alkyd resins can be used without any limitation on the production method and the other detailed structures. As used herein, a (meth)acryloyl group refers to one or both of an acryloyl group and a methacryloyl group. In addition, (meth)acrylate collectively refers to acrylate and methacrylate.

The acrylic-modified alkyd resin structure which is a main backbone of the (meth)acryloyl group-containing acrylic-modified alkyd resin can be formed, for example, by reacting an acrylic resin intermediate (A) and an alkyd resin intermediate (B). In addition, examples of methods for introducing a (meth)acryloyl group into the resin structure include: a method of using, as the acrylic resin intermediate (A) or the alkyd resin intermediate (B), a compound having a (meth)acryloyl group; and a method of using, in addition to the acrylic resin intermediate (A) and the alkyd resin intermediate (B), a third component having a (meth)acryloyl group as an essential starting material.

As the acrylic resin intermediate (A), any polymers that have a similar structure to common acrylic resins but have a functional group capable of reacting with a hydroxy group or an acid group of the alkyd resin intermediate (B) can be widely used without any limitation on the other detailed structures. Examples of the functional groups include an acid group, a hydroxy group, an isocyanate group, and an amino group. Among them, the functional group is preferably an acid group since the resulting (meth)acryloyl group-containing acrylic-modified alkyd resin can be easily made aqueous. The acrylic resin intermediate (A) preferably has an acid value in the range of 50 to 300 mg KOH and more preferably in the range of 150 to 250 mg KOH.

The acrylic resin intermediate (A) preferably has a weight average molecular weight (Mw) in the range of 1,000 to 50,000, and more preferably in the range of 2,000 to 20,000 since the resulting (meth)acryloyl group-containing acrylic-modified alkyd resin is superior in the coating appearance and the adhesion to substrates. Furthermore, the acrylic resin intermediate (A) preferably has a molecular weight distribution (Mw/Mn) in the range of 2 to 10.

Note that molecular weights and molecular weight distributions of resins in the present invention are values measured by gel permeation chromatography (GPC) under the following conditions.

Measurement apparatus: HLC-8320GPC from Tosoh Corporation
Column: TSK gel 4000HXL, TSK gel 3000HXL, TSK gel 2000HXL, and TSK gel 1000HXL, from Tosoh Corporation
Detector: refractive index detector (RI)
Data processing: Multistation GPC-8020 model II from Tosoh Corporation
Measurement conditions
Column temperature: 40° C.
Solvent: tetrahydrofuran
Flow rate: 0.35 ml/min
Standard: monodispersed polystyrene
Sample: a 0.2% tetrahydrofuran solution in terms of resin solid filtered through a microfilter (100 µl)

The acrylic resin intermediate (A) may be, for example, an acrylic copolymer of a monomer having a functional group capable of reacting with the alkyd resin intermediate (B) and another monomer. When the acrylic resin intermediate (A) has a (meth)acryloyl group, a (meth)acryloyl group can be introduced by a method in which a part of functional groups of the acrylic resin intermediate (A) is reacted with a (meth)acryloyl group-containing compound having a functional group that is capable of reacting with the former functional groups. The functional group used for introducing a (meth)acryloyl group may be the same as or different from the functional group capable of reacting with the alkyd resin intermediate (B).

Examples of monomers constituting the acrylic resin intermediate (A) include acid group-containing monomers, such as (meth)acrylic acid, (acryloyloxy)acetic acid, 2-carboxyethyl acrylate, and 3-carboxypropyl acrylate;

hydroxy group-containing (meth)acrylate monomers, such as hydroxyethyl (meth)acrylate, hydroxypropyl (meth)acrylate, and hydroxybutyl acrylate;

an isocyanate group-containing monomer, such as 2-isocyanatoethyl acrylate;

aliphatic (meth)acrylate monomers, such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, pentyl (meth)acrylate, hexyl (meth)acrylate, heptyl (meth)acrylate, octyl (meth)acrylate, 2-ethylhexyl (meth)acrylate, and nonyl (meth)acrylate;

alicyclic (meth)acrylate monomers, such as cyclohexyl (meth)acrylate, isobornyl (meth)acrylate, dicyclopentanyl (meth)acrylate, and adamantyl mono(meth)acrylate;

heterocyclic (meth)acrylate monomers, such as glycidyl (meth)acrylate and tetrahydrofurfuryl acrylate;

aromatic (meth)acrylate monomers, such as phenyl (meth)acrylate, benzyl (meth)acrylate, phenoxy (meth)acrylate, and phenoxyethyl acrylate;

a silyl group-containing (meth)acrylate monomer, such as 3-metacryloxypropyltrimethoxysilane;

aminoalkyl (meth)acrylate monomers, such as N,N-dimethylaminoethyl (meth)acrylate, N,N-diethylaminoethyl (meth)acrylate, and N,N-diethylaminopropyl (meth)acrylate;

(per)fluoroalkyl (meth)acrylate monomers, such as 2,2,2-trifluoroethyl (meth)acrylate, 2,2,3,3-tetrafluoropropyl (meth)acrylate, 1H,1H,5H-octafluoropentyl (meth)acrylate, 1H,1H,2H,2H-heptadecafluorodecyl (meth)acrylate, and perfluoroethyloxyethyl (meth)acrylate;

(per)fluoroalkyl/perfluorovinyl ethers with a (per)fluoroalkyl group having 1 to 18 carbon atoms, such as trifluoromethyl trifluorovinyl ether, pentafluoroethyl trifluorovinyl ether, and heptafluoropropyl trifluorovinyl ether;

unsaturated dicarboxylic acid esters, such as dimethyl fumarate, diethyl fumarate, dibutyl fumarate, dimethyl itaconate, dibutyl itaconate, methyl ethyl fumarate, methyl butyl fumarate, and methyl ethyl itaconate;

aromatic vinyl monomers, such as styrene, α-methylstyrene, and chlorostyrene;

diene compounds, such as butadiene, isoprene, piperylene, and dimethylbutadiene;

halogenated vinyls or halogenated vinylidenes, such as vinyl chloride and vinyl bromide;

unsaturated ketones, such as methyl vinyl ketone and butyl vinyl ketone;

vinyl esters, such as vinyl acetate and vinyl butyrate;

vinyl ethers, such as methyl vinyl ether and butyl vinyl ether;

cyanated vinyls, such as acrylonitrile, methacrylonitrile, and cyanated vinylidene;

acryl amides or alkyd-substituted amides thereof;

N-substituted maleimides, such as N-phenylmaleimide and N-cyclohexylmaelimide; and fluorine-containing α-olefins, such as fluorinated vinyl, fluorinated vinylidene, trifluoroethylene, chlorotrifluoroethylene, bromotrifluoroethylene, pentafluoropropylene, and hexafluoropropylene. The compounds may be used alone or in combination of two or more thereof.

A part of the reaction materials of the acrylic resin intermediate (A) is preferably an oil or fat or a fatty acid since the resulting (meth)acryloyl group-containing acrylic-modified alkyd resin is further superior in the coating appearance and the adhesion to substrates. In this case, the acrylic resin intermediate (A) preferably has an oil length of 10 or more, and more preferably in the range of 10 to 50. Note that the oil length of a resin means the percentage by mass of an oil or fat or a fatty acid based on the total mass of the raw materials of the resin.

Examples of the oils or fats or the fatty acids include oils or fats, such as linseed oil, tung oil, rice oil, safflower oil, soybean oil, tall oil, rapeseed oil, palm oil, castor oil, dehydrated castor oil, and coconut oil; fatty acids derived from the oils or fats; regenerated oils or fats thereof; oleic acid, linoleic acid, linolenic acid, arachidonic acid, docosahexaenoic acid, and higher fatty acids having 12 to 30 carbon atoms. The compounds may be used alone or in combination of two or more thereof. Among them, an oil or fat or a fatty acid having an iodine value of 100 or more is preferred since the resulting (meth)acryloyl group-containing acrylic-modified alkyd resin is further superior in the coating appearance and the adhesion to substrates. Specific examples of oils or fats or fatty acids having an iodine value of 100 or more include tung oil, linseed oil, dehydrated castor oil, soybean oil, safflower oil, and tall oil; fatty acids derived from the oils or fats; and regenerated oils or fats thereof.

The acrylic resin intermediate (A) can be produced by the same method as for common acrylic resins. A specific example of the production method is a method in which a mixture of an acrylic monomer and a polymerization initiator is added dropwise into a flask that already contains an organic solvent and is polymerized under a temperature condition at approximately from 80 to 150° C. The mixture of an acrylic monomer and a polymerization initiator may be diluted with an organic solvent as needed. In addition, also when a part of the reaction materials of the acrylic resin intermediate (X) is an oil or fat or a fatty acid, a method may be mentioned in which a mixture of an acrylic monomer and a polymerization initiator is added dropwise into a flask that already contains an oil or fat or a fatty acid together with an organic solvent and is polymerized under a temperature condition at approximately from 80 to 150° C. Also in this case, the mixture of an acrylic monomer and a polymerization initiator may be diluted with an organic solvent as needed.

Specific examples of the alkyd resin intermediates (B) include polyester resins produced by reaction between a polybasic acid (b1), a polyhydric alcohol (b2), and an oil or fat or a fatty acid (b3) as essential starting materials. The alkyd resin intermediate (B) preferably has an oil length of 10 or more and more preferably in the range of 25 to 70 since the resulting (meth)acryloyl group-containing acrylic-modified alkyd resin is superior in the coating appearance and the adhesion to substrates.

The alkyd resin intermediate (B) preferably has a weight average molecular weight (Mw) of in the range of 1,000 to 100,000 and more preferably in the range of 2,000 to 50,000 since the resulting (meth)acryloyl group-containing acrylic-modified alkyd resin is superior in the coating appearance and the adhesion to substrates. The alkyd resin intermediate (B) preferably has a molecular weight distribution (Mw/Mn) in the range of 2 to 50. Furthermore, the alkyd resin intermediate (B) preferably has an acid value in the range of 10 to 100 mg KOH/g, and preferably has a hydroxy group in the range 10 to 150 mg KOH/g.

Examples of the polybasic acids (b1) include aliphatic dibasic acids, such as malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, heptadecanedioic acid, octadecanedioic acid, nonadecanedioic acid, and icosanedioic acid; aliphatic unsaturated dibasic acids or anhydrides thereof, such as tetrahydrophthalic acid, maleic acid, maleic anhydride, fumaric acid, citraconic acid, itaconic acid, and glutaconic acid; alicyclic dibasic acids, such as hexahydrophthalic acid and 1,4-cyclohexane dicarboxylic acid; aromatic dibasic acids or anhydrides thereof, such as phthalic acid, phthalic anhydride, terephthalic acid, isophthalic acid, and orthophthalic acid; aliphatic tribasic acids, such as 1,2,5-hexane tricarboxylic acid and 1,2,4-cyclohexane tricarboxylic acid; and aromatic tribasic acids or anhydrides thereof, such as trimellitic acid, trimellitic anhydride, 1,2,5-benzene tricarboxylic acid, and 2,5,7-naphthalene tricarboxylic acid. The compounds may be used alone or in combination of two or more thereof. Among them, an aromatic polybasic acid is preferably used as an essential component since the resulting (meth)acryloyl group-containing acrylic-modified alkyd resin is superior in the coating appearance and the adhesion to substrates, and also in heat resistance.

Examples of the polyhydric alcohols (b2) include diols, such as ethylene glycol, diethylene glycol, propylene glycol, dipropylene glycol, 1,3-propanediol, 1,2,2-trimethyl-1,3-propanediol, 2,2-dimethyl-3-isopropyl-1,3-propanediol, 1,4-butanediol, 1,3-butanediol, 3-methyl-1,3-butanediol, 1,5-pentanediol, 3-methyl-1,5-pentanediol, neopentylglycol, 1,6-hexanediol, 1,4-bis(hydroxymethyl)cyclohexane, and 2,2,4-trimethyl-1,3-pentanediol; polyols, such as trimethylolethane, trimethylolpropane, glycerol, hexanetriol, and pentaerythritol; modified polyether polyols obtained by ring opening polymerization of the diols or polyols with various cyclic ether bond-containing compounds, such as ethylene oxide, propylene oxide, tetrahydrofuran, ethyl glycidyl ether, propyl glycidyl ether, butyl glycidyl ether, phenyl glycidyl ether, and allyl glycidyl ether; and lactone-based polyester polyols obtained by a polycondensation reaction of the diols or polyols with s-caprolactone or various other lactones. The compounds may be used alone or in combination of two or more thereof. Among them, a polyol, such as trimethylolethane, trimethylolpropane, glycerol, hexanetriol, or pentaerythritol, or a modified polyol thereof, or a tri- or higher hydric alcohol is preferably used in that the resulting (meth)acryloyl group-containing acrylic-modified alkyd resin is superior in the coating appearance and the adhesion to substrates, and also in alkali resistance, acid resistance, solvent resistance, and the like. In addition, a polyhydric alcohol having a (poly)oxyethylene structure in the molecular structure is preferably used in that the resulting (meth)acryloyl group-containing acrylic-modified alkyd resin can easily be made aqueous. When a polyhydric alcohol having a (poly)oxyethylene structure is used, the proportion of the polyhydric alcohol having a (poly)oxyethylene structure is preferably in the range of 0.1 to 50% by mass and more preferably in the range of 1 to 30% by mass in the total mass of the reaction materials of the (meth)acryloyl group-containing acrylic-modified alkyd resin.

Examples of the oils or fats or the fatty acids (b3) include oils or fats, such as linseed oil, tung oil, rice oil, safflower oil, soybean oil, tall oil, rapeseed oil, palm oil, castor oil, dehydrated castor oil, and coconut oil; fatty acids derived from the oils or fats; regenerated oils or fats thereof; and higher fatty acids having 12 to 30 carbon atoms, such as oleic acid, linoleic acid, linolenic acid, arachidic acid, and docosahexaenoic acid. The compounds may be used alone or in combination of two or more thereof. Among them, an oil or fat or a fatty acid having an iodine value of 100 or more is preferred since the resulting (meth)acryloyl group-containing acrylic-modified alkyd resin is further superior in the coating appearance and the adhesion to substrates. Specific examples of oils or fats or fatty acids having an iodine value of 100 or more include tung oil, linseed oil, dehydrated castor oil, soybean oil, safflower oil, and tall oil; fatty acids derived from the fats or oils; and regenerated fats or oil thereof.

A part of the reaction materials of the alkyd resin intermediate (B) may be a monobasic acid (b4), as needed. Examples of monobasic acids (b4) include methanoic acid, ethanoic acid, propanoic acid, butanoic acid, pentanoic acid, hexanoic acid, heptanoic acid, octanoic acid, nonanoic acid, decanoic acid, dodecanoic acid, tetradecanoic acid, hexadecanoic acid, heptadecanoic acid, octadecanoic acid, benzoic acid, p-tert-butylbenzoic acid, and rosin. The compounds may be used alone or in combination of two or more thereof. Among them, a monobasic acid having a cyclic structure, such as benzoic acid, p-tert-butylbenzoic acid, or rosin is preferably used since the resulting (meth)acryloyl group-containing acrylic-modified alkyd resin is superior in the coating appearance and the adhesion to substrates, and also in heat resistance.

In the case of the alkyd resin intermediate (B) having a (meth)acryloyl group, the (meth)acryloyl group can be introduced, for example, by using a hydroxy group-containing (meth)acrylate compound or an acid group-containing (meth)acrylate compound as a part of the reaction materials of the alkyd resin intermediate (B). Examples of the hydroxy group-containing (meth)acrylate compounds include hydroxy group-containing (meth)acrylate compounds, such as hydroxyethyl (meth)acrylate, hydroxypropyl (meth)acrylate, trimethylolpropane di(meth)acrylate, pentaerythritol tri(meth)acrylate, ditrimethylolpropane tri(meth)acrylate, and dipentaerythritol penta(meth)acrylate; (poly)oxyalkylene-modified forms of the various hydroxy group-containing (meth)acrylate compounds which have a (poly)oxyalkylene chain, such as a (poly)oxyethylene chain, a (poly)oxypropylene chain, or a (poly)oxytetramethylene chain, introduced in the molecular structure thereof; and lactone-modified forms of the various hydroxy group-containing (meth)acrylate compounds which have a (poly)lactone structure introduced in the molecular structure thereof. Examples of the acid group-containing (meth)acrylate compounds include (meth)acrylic acid, (acryloyloxy)acetic acid, 2-carboxyethyl acrylate, and 3-carboxypropyl acrylate.

The alkyd resin intermediate (B) can be produced by the same method as for common alkyd resins. A specific example of the production method is a method in which all the reaction materials are put at once in a reaction vessel and are reacted at a temperature of approximately from 120 to 300° C.

In the case of the acrylic resin intermediate (A) or the alkyd resin intermediate (B) having a (meth)acryloyl group, the (meth)acryloyl group-containing acrylic-modified alkyd resin can be produced as a reaction product of the two intermediates. An example of a method for reacting the acrylic resin intermediate (A) and the alkyd resin intermediate (B) is a method in which the acrylic resin intermediate (A) and the alkyd resin intermediate (B) are added at once or portionwise into a reaction vessel and are reacted at a temperature of approximately from 120 to 300° C. The acrylic resin intermediate (A) and the alkyd resin intermediate (B) used may each be previously produced, or one of them that is previously produced may be added at once or portionwise into a reaction vessel in which the other one is previously produced.

As described above, in addition to the acrylic resin intermediate (A) and the alkyd resin intermediate (B), another component may be used as a starting material for reaction to produce the (meth)acryloyl group-containing acrylic-modified alkyd resin of the present invention. Specific examples of such (meth)acryloyl group-containing acrylic-modified alkyd resins include: a reaction product of the acrylic resin intermediate (A), the alkyd resin intermediate (B), a polyisocyanate compound (C), and a hydroxy group-containing (meth)acrylate compound (D) as essential starting materials; and a reaction product of the acrylic resin intermediate (A), the alkyd resin intermediate (B), and an isocyanate group-containing (meth)acrylate compound (E) as essential starting materials.

In any of the methods, the mass ratio [(A)/(B)] of the acrylic resin intermediate (A) to the alkyd resin intermediate (B) is preferably in the range of 1/1 to 1/5 since the resulting (meth)acryloyl group-containing acrylic-modified alkyd resin is superior in the coating appearance and the adhesion to substrates and can easily be made aqueous. In addition, the proportion by mass of the sum of the acrylic resin intermediate (A) and the alkyd resin intermediate (B) in the total mass of the reaction materials of the (meth)acryloyl group-containing acrylic-modified alkyd resin is preferably 50% by mass or more and more preferably 80% by mass or more.

Examples of the polyisocyanate compound (C) include aliphatic diisocyanate compounds, such as butane diisocyanate, hexamethylene diisocyanate, 2,2,4-trimethylhexamethylene diisocyanate, and 2,4,4-trimethylhexamethylene diisocyanate; alicyclic diisocyanate compounds, such as norbornane diisocyanate, isophorone diisocyanate, hydrogenated xylylene diisocyanate, and hydrogenated diphenylmethane diisocyanate; aromatic diisocyanate compounds, such as tolylene diisocyanate, xylylene diisocyanate, tetramethylxylylene diisocyanate, diphenylmethane diisocyanate, and 1,5-naphthalene diisocyanate; polymethylene polyphenyl polyisocyanates having a repeating structure represented by the following structure formula (1); and isocyanurate-modified forms, biuret-modified forms, and allophanate-modified forms thereof. The compounds may be used alone or in combination of two or more. Among them, a polyisocyanate compound having a ring structure in the molecular structure is preferred since the resulting (meth)acryloyl group-containing acrylic-modified alkyd resin is superior in the coating appearance and the adhesion to substrates, and also in heat resistance, and alicyclic diisocyanate is particularly preferred.

[Chem. 3]

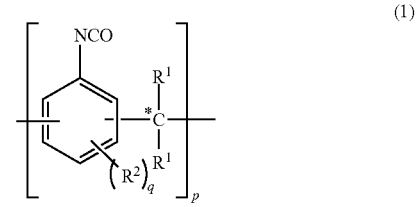

(1)

[wherein, $R^1$'s independently represent a hydrogen atom or a hydrocarbon group having 1 to 6 carbon atoms, $R^2$ independently represents an alkyl group having 1 to 4 carbon atoms or a bonding site for linking to the structure moiety represented by the structure formula (1) via a methylene group indicated with *, q is 0 or an integer of 1 to 3, and p is an integer of 1 or more.]

Examples of the hydroxy group-containing (meth)acrylate compounds (D) include hydroxy group-containing (meth)acrylate compounds, such as hydroxyethyl (meth)acrylate, hydroxypropyl (meth)acrylate, trimethylolpropane di(meth)acrylate, pentaerythritol tri(meth)acrylate, ditrimethylolpropane tri(meth)acrylate, and dipentaerythritol penta(meth)acrylate; (poly)oxyalkylene-modified forms of the various hydroxy group-containing (meth)acrylate compounds which have a (poly)oxyalkylene chain, such as a (poly)oxyethylene chain, a (poly)oxypropylene chain, or a (poly)oxytetramethylene chain, introduced in the molecular structure thereof; lactone-modified forms of the various hydroxy group-containing (meth)acrylate compounds which have a (poly)lactone structure introduced in the molecular structure thereof.

The method of producing the (meth)acryloyl group-containing acrylic-modified alkyd resin by reaction between the acrylic resin intermediate (A), the alkyd resin intermediate (B), the polyisocyanate compound (C), and the hydroxy group-containing (meth)acrylate compound (D) as essential starting materials is not particularly limited, and the order of reaction, the mass ratio, and the like of the reaction materials may be appropriately selected. An example is a method in which the acrylic resin intermediate (A) is reacted with the alkyd resin intermediate (B) to obtain an intermediate 1, the polyisocyanate compound (C) is reacted with the hydroxy group-containing (meth)acrylate compound (D) under a condition with excess isocyanate groups to obtain an intermediate 2, and then the intermediate 1 is reacted with the intermediate 2. An urethanization catalyst may be appropriately used in the reaction to obtain the intermediate 2 or in the reaction of the intermediate 1 with the intermediate 2.

Examples of the isocyanate group-containing (meth)acrylate compounds (E) include isocyanatoalkyl acrylates, such as 2-isocyanatoethyl acrylate, 2-isocyanatoethyl methacrylate, and 1,1-bis(acryloyloxymethyl)ethyl isocyanate.

The method of producing the (meth)acryloyl group-containing acrylic-modified alkyd resin by reaction between the acrylic resin intermediate (A), the alkyd resin intermediate (B), the polyisocyanate compound (C), and the isocyanate group-containing (meth)acrylate compound (E) as essential starting materials is not particularly limited, and the order of reaction, the mass ratio, and the like of the reaction materials may be appropriately selected. An example is a method in which the acrylic resin intermediate (A) is reacted with the alkyd resin intermediate (B) to obtain an intermediate 1, which is then reacted with the isocyanate group-containing (meth)acrylate compound (E). An urethanization catalyst may be used in the reaction of the intermediate 1 with the isocyanate group-containing (meth)acrylate compound (E).

Since the (meth)acryloyl group-containing acrylic-modified alkyd resin of the present invention is superior in coating appearance and adhesion to substrates, the oil length is preferably in the range of 10 to 70 and more preferably in the range of 30 to 60. In addition, the weight average molecular weight (Mw) is preferably in the range of 5,000 to 500,000 and more preferably in the range of 10,000 to 300,000. The molecular weight distribution (Mw/Mn) is preferably in the range of 2 to 200 and more preferably in the range of 5 to 100. In addition, the acid value is preferably in the range of 10 to 100 mg KOH/g and more preferably in the range of 20 to 80 mg KOH/g.

The (meth)acryloyl group-containing acrylic-modified alkyd resin of the present invention can be used as an active-energy-ray-curable resin composition by appropriately incorporating a photoinitiator or the like therein.

Examples of the photoinitiators include innermolecular hydrogen withdrawing-type photoinitiators, for example, alkylphenone photoinitiators, such as 1-hydroxycyclohexyl phenyl ketone, 2-benzyl-2-dimethylamino-1-(4-morpholinophenyl)-butanone-1, and 2-(dimethylamino)-2-[(4-methylphenyl)methyl]-1-[4-(4-morpholinyl)phenyl]-1-butanone; an acylphosphine oxide photoinitiator, such as 2,4,6-trimethylbenzoyl-diphenyl-phosphine oxide; and a benzophenone compound. The compounds may be used alone or in combination of two or more thereof.

Example of commercial products of the photoinitiators include "IRGACURE 127", "IRGACURE 184", "IRGACURE 250", "IRGACURE 270", "IRGACURE 290", "IRGACURE 369E", "IRGACURE 379EG", "IRGACURE 500", "IRGACURE 651", "IRGACURE 754", "IRGACURE 819", "IRGACURE 907", "IRGACURE 1173", "IRGACURE 2959", "IRGACURE MBF", "IRGACURE TPO", "IRGACURE OXE 01", and "IRGACURE OXE 02", manufactured by BASF.

The amount of the photoinitiator added is preferably in the range of 0.05 to 20 parts by mass and more preferably in the range of 0.1 to 10 parts by mass based on 100 parts by mass of the components excluding solvent components in the active-energy-ray-curable resin composition.

The active-energy-ray-curable resin composition of the present invention may contain, in addition to the (meth)acryloyl group-containing acrylic-modified alkyd resin, another (meth)acryloyl group-containing compound (R). Examples of the another (meth)acryloyl group-containing compounds (R) include mono(meth)acrylate compounds and modified forms thereof (R1), aliphatic hydrocarbon-type poly(meth)acrylate compounds and modified forms thereof (R2), alicyclic poly(meth)acrylate compounds and modified forms thereof (R3), aromatic poly(meth)acrylate compounds and modified forms thereof (R4), epoxy (meth)acrylate resins and modified forms thereof (R5), urethane (meth)acrylate resins and modified forms thereof (R6), acrylic (meth)acrylate resins and modified forms thereof (R7), and dendrimer-type (meth)acrylate resins and modified forms thereof (R8).

Examples of the mono(meth)acrylate compounds and modified forms thereof (R1) include aliphatic mono(meth)acrylate compounds, such as methyl (meth)acrylate, ethyl (meth)acrylate, hydroxyethyl (meth)acrylate, propyl (meth)acrylate, hydroxypropyl (meth)acrylate, butyl (meth)acrylate, and 2-ethylhexyl (meth)acrylate; alicyclic mono(meth)acrylate compounds, such as cyclohexyl (meth)acrylate, isobornyl (meth)acrylate, and adamantyl mono(meth)acrylate; heterocyclic mono(meth)acrylate compounds, such as glycidyl (meth)acrylate and tetrahydrofurfuryl acrylate; aromatic mono(meth)acrylate compounds, such as phenyl (meth)acrylate, benzyl (meth)acrylate, phenoxy (meth)acrylate, phenoxyethyl (meth)acrylate, phenoxyethoxyethyl (meth)acrylate, 2-hydroxy-3-phenoxypropyl (meth)acrylate, phenylphenol (meth)acrylate, phenylbenzyl (meth)acrylate, phenoxybenzyl (meth)acrylate, benzylbenzyl (meth)acrylate, phenylphenoxyethyl (meth)acrylate, and p-cumylphenol (meth)acrylate; (poly)oxyalkylene-modified forms of the various mono(meth)acrylate compounds which have a (poly)oxyalkylene chain, such as a (poly)oxyethylene chain, a (poly)oxypropylene chain, or a (poly)oxytetramethylene chain, introduced in the molecular structure thereof; and lactone-modified form of the various mono(meth)acrylate compounds which have a (poly)lactone structure introduced in the molecular structure thereof.

Examples of the aliphatic hydrocarbon-type poly(meth)acrylate compounds and modified forms thereof (R2) include aliphatic di(meth)acrylate compounds, such as ethylene glycol di(meth)acrylate, propylene glycol di(meth)acrylate, butanediol di(meth)acrylate, hexanediol di(meth)acrylate, and neopentylglycol di(meth)acrylate; aliphatic tri(meth)acrylate compounds, such as trimethylolpropane tri(meth)acrylate, glycerol tri(meth)acrylate, pentaerythritol tri(meth)acrylate, ditrimethylolpropane tri(meth)acrylate, and dipentaerythritol tri(meth)acrylate; tetra- or higher functional aliphatic poly(meth)acrylate compounds, such as pentaerythritol tetra(meth)acrylate, ditrimethylolpropane tetra(meth)acrylate, dipentaerythritol tetra(meth)acrylate, dipentaerythritol penta (meth)acrylate, and dipentaerythritol hexa(meth)acrylate; (poly)oxyalkylene-modified forms of the various aliphatic hydrocarbon-type poly(meth)acrylate compounds which have a (poly)oxyalkylene chain, such as a (poly)oxyethylene chain, a (poly)oxypropylene chain, or a (poly)oxytetramethylene chain, introduced in the molecular structure thereof; and lactone-modified forms of the various aliphatic hydrocarbon-type poly(meth)acrylate compounds which have a (poly)lactone structure introduced in the molecular structure thereof.

Examples of the alicyclic poly(meth)acrylate compound and modified forms thereof (R3) include alicyclic di(meth)acrylate compounds, such as 1,4-cyclohexanedimethanol di(meth)acrylate, norbornane di(meth)acrylate, norbornanedimethanol di(meth)acrylate, dicyclopentanyl di(meth)acrylate, and tricyclodecanedimethanol di(meth)acrylate; (poly)oxyalkylene-modified forms of the various alicyclic poly(meth)acrylate compounds which have a (poly)oxyalkylene chain, such as a (poly)oxyethylene chain, a (poly)oxypropylene chain, or a (poly)oxytetramethylene chain, introduced in the molecular structure thereof; and lactone-modified forms of the various alicyclic poly(meth)acrylate compounds which have a (poly)lactone structure introduced in the molecular structure thereof.

Examples of the aromatic poly(meth)acrylate compounds and modified forms thereof (R4) include biphenol di(meth)acrylate, bisphenol di(meth)acrylate;

(poly)oxyalkylene-modified forms of the various aromatic poly(meth)acrylate compounds which have a (poly)oxyalkylene chain, such as a (poly)oxyethylene chain, a (poly)oxypropylene chain, or a (poly)oxytetramethylene chain, introduced in the molecular structure thereof; and lactone-modified forms of the various aromatic poly(meth)acrylate compounds which have a (poly)lactone structure introduced in the molecular structure thereof.

An example of the epoxy (meth)acrylate resin and modified form thereof (R5) is a compound obtained by reacting (meth)acrylic acid or anhydride thereof with an epoxy resin. Examples of the epoxy resins include diglycidyl ethers of dihydric phenols, such as hydroquinone and catechol; diglycidyl ethers of biphenol compounds, such as 3,3'-biphenyl diol and 4,4'-biphenyl diol; bisphenol-type epoxy resins, such as bisphenol A-type epoxy resin, bisphenol B-type epoxy resin, bisphenol F-type epoxy resin, and bisphenol S-type epoxy resin; polyglycidyl ethers of naphthol compounds, such as 1,4-naphthalene diol, 1,5-naphthalene diol, 1,6-naphthalene diol, 2,6-naphthalene diol, 2,7-naphthalene diol, binaphthol, and bis(2,7-dihydroxynaphthyl) methane; triglycidyl ethers of 4,4',4"-methylidine trisphenol and the like; novolac-type epoxy resins, such as a phenol novolac-type epoxy resin and a cresol novolac resin; (poly)oxyalkylene-modified forms of the various epoxy resins which have a (poly)oxyalkylene chain, such as a (poly)oxyethylene chain, a (poly)oxypropylene chain, or a (poly)oxytetramethylene chain, introduced in the molecular structure thereof; and lactone-modified forms of the various epoxy resins which have a (poly)lactone structure introduced in the molecular structure thereof.

Examples of the urethane (meth)acrylate resins and modified forms thereof (R6) include compounds obtained by reacting various polyisocyanate compounds, hydroxy group-containing (meth)acrylate compounds, and various polyol compounds as needed. Examples of the polyisocyanate compounds include aliphatic diisocyanate compounds, such as butane diisocyanate, hexamethylene diisocyanate, 2,2,4-trimethylhexamethylene diisocyanate, and 2,4,4-trimethylhexamethylene diisocyanate; alicyclic diisocyanate compounds, such as norbornane diisocyanate, isophorone diisocyanate, hydrogenated xylylene diisocyanate, and hydrogenated diphenylmethane diisocyanate; aromatic diisocyanate compounds, such as tolylene diisocyanate, xylylene diisocyanate, tetramethylxylylene diisocyanate, diphenylmethane diisocyanate, and 1,5-naphthalene diisocyanate; polymethylene polyphenyl polyisocyanates having a repeating structure represented by the structure formula (1); and isocyanurate-modified forms, biuret-modified form, and allophanate-modified form thereof.

Examples of the hydroxy group-containing (meth)acrylate compounds include hydroxy group-containing (meth)acrylate compounds, such as hydroxyethyl (meth)acrylate, hydroxypropyl (meth)acrylate, trimethylolpropane di(meth)acrylate, pentaerythritol tri(meth)acrylate, ditrimethylolpropane tri(meth)acrylate, and dipentaerythritol penta(meth)acrylate; (poly)oxyalkylene-modified forms of the various hydroxy group-containing (meth)acrylate compounds which have a (poly)oxyalkylene chain, such as a (poly)oxyethylene chain, a (poly)oxypropylene chain, or a (poly)oxytetramethylene chain, introduced in the molecular structure thereof; and lactone-modified forms of the various hydroxy group-containing (meth)acrylate compounds which have a (poly)lactone structure introduced in the molecular structure thereof.

Examples of the polyol compounds include aliphatic polyol compounds, such as ethylene glycol, propylene glycol, butanediol, hexanediol, glycerol, trimethylolpropane, ditrimethylolpropane, pentaerythritol, and dipentaerythritol; aromatic polyol compounds, such as biphenol and bisphenol; (poly)oxyalkylene-modified forms of the various polyol compounds which have a (poly)oxyalkylene chain, such as a (poly)oxyethylene chain, a (poly)oxypropylene chain, or a (poly)oxytetramethylene chain, introduced in the molecular structure thereof; lactone-modified forms of the various polyol compounds which have a (poly)lactone structure introduced in the molecular structure thereof; and hydroxy group-containing acrylic resins.

Examples of the hydroxy group-containing acrylic resins include acrylic copolymers of a hydroxy group-containing monomer and another monomer. Examples of the hydroxy group-containing monomers include a (meth)acrylate monomer (a), such as hydroxyethyl (meth)acrylate or hydroxypropyl (meth)acrylate.

Examples of the another monomers include (meth)acrylic acid alkyl esters, such as methyl (meth)acrylate, ethyl (meth)acrylate, propyl (meth)acrylate, butyl (meth)acrylate, and 2-ethylhexyl (meth)acrylate; cyclo-ring-containing (meth)acrylates, such as cyclohexyl (meth)acrylate, isoboronyl (meth)acrylate, and dicyclopentanyl (meth)acrylate; aromatic ring-containing (meth)acrylates, such as phenyl (meth)acrylate, benzyl (meth)acrylate, and phenoxyethyl acrylate; a carboxy group-containing monomers, such as (meth)acrylic acid; isocyanate group-containing monomers, such as 2-acryloyloxyethyl isocyanate, 2-methacryloyloxyethyl isocyanate, and 1,1-bis(acryloyloxymethyl)ethyl isocyanate; glycidyl group-containing monomers, such as glycidyl (meth)acrylate and 4-hydroxybutyl acrylate glycidyl ether; a silyl group-containing (meth)acrylate, such as 3-methacryloxypropyltrimethoxysilane; styrene derivatives, such as styrene, α-methylstyrene, and chlorostyrene; and a (meth)acrylate having a (poly)oxyalkylene glycol chain. The compounds may be used alone or in combination of two or more thereof.

The weight average molecular weight (Mw) of the hydroxy group-containing acrylic resin is preferably in the range of 1,000 to 20,000. The hydroxy group value thereof is preferably 100 mg KOH/g or lower and more preferably 60 mg KOH/g or lower. In addition, the acid value thereof is preferably 50 mg KOH/g or lower.

In the active-energy-ray-curable resin composition of the present invention, the ratio of the (meth)acryloyl group-containing acrylic-modified alkyd resin and the (meth)acryloyl group-containing compound (R) blended can be adjusted to any value depending on desired coating properties, but the proportion of the (meth)acryloyl group-containing acrylic-modified alkyd resin in the sum of both is preferably in the range of 20 to 80% by mass since such an active-energy-ray-curable resin composition is further superior in the adhesion to substrates and the heat resistance in the cured coating.

In addition, the active-energy-ray-curable resin composition preferably contains the (meth)acryloyl group-containing acrylic-modified alkyd resin and the (meth)acryloyl group-containing compound (R) in an amount of 65 parts by mass or more in total based on 100 parts by mass of the entire resin solid, more preferably 70 parts by mass or more, and particularly preferably 80 parts by mass or more.

The active-energy-ray-curable resin composition of the present invention may be diluted with a solvent for the purpose of appropriately adjusting the viscosity in application. The solvent used may be common organic solvents or may be various aqueous solvents. Examples of the organic solvents include alcohol solvents, such as propanol and butanol, ketone solvents, such as methyl ethyl ketone and methyl isobutyl ketone, ester solvents, such as ethyl acetate and butyl acetate, and aromatic hydrocarbon solvents, such as toluene and xylene.

When an aqueous solvent is used as the solvent, that is, when the active-energy-ray-curable resin composition of the present invention is made aqueous, the method of making the composition aqueous is not particularly limited, and a wide variety of methods can be used. For example, when the (meth)acryloyl group-containing acrylic-modified alkyd resin or the (meth)acryloyl group-containing compound (R) has an acid group, an example is a method in which the composition is neutralized with an amine compound or the like and is dissolved or dispersed in an aqueous solvent. Alternatively, an aqueous composition may be produced using an emulsifier or the like.

When the active-energy-ray-curable resin composition of the present invention contains the (meth)acryloyl group-containing compound (R), the respective solutions or dispersions of the (meth)acryloyl group-containing acrylic-modified alkyd resin and the (meth)acryloyl group-containing compound (R) in an aqueous solvent may be produced in advance and then the solutions or dispersions may be mixed, or the (meth)acryloyl group-containing acrylic-modified alkyd resin and the (meth)acryloyl group-containing compound (R) are dissolved or dispersed together in an aqueous solvent.

Examples of the amine compounds used in the neutralization step include monomethylamine, dimethylamine, trimethylamine, monoethylamine, diethylamine, triethylamine, mono-n-propylamine, dimethyl-n-propylamine, monoethanolamine, diethanolamine, triethanolamine, N-methylethanolamine, N-aminoethylethanolamine, N-methyldiethanolamine, monoisopropanolamine, diisopropanolamine, triisopropanolamine, N,N-dimethylethanolamine, N,N-dimethylpropanolamine, dimethylaminopropylacrylamide, diethylacrylamide, isopropylacrylamide, dimethylaminoethyl acrylate, and diethylaminoethyl methacrylate. The compounds may be used alone or in combination of two or more thereof. The amount of the amine compound added is preferably in the range of 40 to 120% by mole based on the acid groups in the (meth)acryloyl group-containing acrylic-modified alkyd resin or the (meth)acryloyl group-containing compound (R).

The neutralization step can be achieved, for example, by the following procedure. First, an amine compound is added to an organic solvent solution of the (meth)acryloyl group-containing acrylic-modified alkyd resin, the (meth)acryloyl group-containing compound (R), or a mixture thereof, and the resulting mixture was stirred under a temperature condition at room temperature to 80° C. to effect neutralization. Next, an aqueous solvent is added dropwise or added portionwise and the initial organic solvent is removed with heat under a reduced pressure, thereby obtaining the active-energy-ray-curable resin composition.

Examples of the aqueous solvents include water and various hydrophilic solvents. Examples of the hydrophilic solvents include alkylene glycol monoalkyl ethers, such as ethylene glycol monomethyl ether, ethylene glycol monoethyl ether, ethylene glycol monopropyl ether, ethylene glycol monobutyl ether, and propylene glycol monomethyl ether; dialkylene glycol dialkyl ethers, such as diethylene glycol dimethyl ether, diethylene glycol diethyl ether, diethylene glycol dipropyl ether, and diethylene glycol dibutyl ether; and alkylene glycol alkyl ether acetates, such as ethylene glycol monomethyl ether acetate, ethylene glycol monoethyl ether acetate, and propylene glycol monomethyl ether acetate. The compounds may be used alone or in combination of two or more thereof. Among them, water preferably accounts for 80% by mass or more of the aqueous solvent.

The active-energy-ray-curable resin composition of the present invention may contain various additives depending on the desired property. Examples of various additives include polycarbodiimide resins, oxazoline group-containing resins, amino resins, fluorine-based additives, silicone-based additives, cellulose-based additives, ultraviolet ray absorbers, antioxidants, photosensitizers, silane coupling agents, rheology controlling agents, antifoaming agents, antistatic agents, antifogging agents, adhesion aids, organic pigments, inorganic pigments, extender pigments, organic fillers, and inorganic fillers. The amount of the additive added is appropriately adjusted depending on the desired property.

The industrial application of the active-energy-ray-curable resin composition of the present invention is not particularly limited and the active-energy-ray-curable resin composition can be used for various coating application. Since the active-energy-ray-curable resin composition of the present invention is characterized by high adhesion to various substrates and superior heat resistance, particularly among the various coating applications, the composition can be suitably used as an undercoat agent for an inorganic-material thin film. A case where the active energy curable resin composition of the present invention is used as an undercoat layer for an inorganic-material thin film will be described in detail below.

Since the active-energy-ray-curable resin composition of the present invention has high adhesion to various materials, the substrate is not particularly limited and various materials can be used. Specific examples include various resin materials, such as a polyethylene terephthalate (PET) resin, a polybutylene terephthalate (PBT) resin, a PET/PBT alloy resin, an unsaturated polyester resin, a polyethylene resin, a polypropylene resin, a polyphenylene sulfide (PPS) resin, a polycarbonate resin, an acrylonitrile-butadiene-styrene copolymer resin (ABS), an acrylic (PMMA) resin, and a polyamide resin, a resin material reinforced with a glass fiber, a filler, or the like, such as a bulk molding compound (BMC), and an aluminum die cast (ALD).

In forming the undercoat layer, the active-energy-ray-curable resin composition of the present invention is applied on a substrate by a method of spray coating, dip coating, spin coating, flow coating, roller coating, or the like. The amount of coating in this case is preferably such an amount that the film thickness after curing is in the range of 5 to 60 µm and more preferably in the range of 10 to 40 µm. Such a film thickness of the cured coating within the above range is preferred in terms of providing adhesion effect and curability of the coating.

After the active-energy-ray-curable resin composition is applied on the substrate by the method as mentioned above, the coating is pre-heated under a temperature condition in the range of 50 to 150° C. for 5 to 25 minutes for the purpose of vaporizing the solvent component in the resin composition.

After the completion of the pre-heat step, the resin composition is cured by irradiation with an active energy ray, thereby forming the undercoat layer. Examples of the active energy rays used in the present invention include ultraviolet rays and electron beams. In the case of curing with ultraviolet rays, an ultraviolet irradiator provided with a xenon lamp, a high pressure mercury lamp, or a metal halide lamp as a light source can be used, and the light quantity, the arrangement of the light source, and the like are adjusted as desired. In the present invention, the irradiation with ultraviolet rays is preferably performed so that the integral light quantity is 50 to 5000 mJ/cm$^2$ and more preferably 300 to 4000 mJ/cm$^2$.

The substrate having the undercoat layer of the present invention formed as described above is provided thereon with a tin film of an inorganic material formed by a method of vacuum deposition or sputtering, and is further provided thereon with a topcoat layer or the like as desired. Examples of the inorganic materials include silicon, aluminum, iron, nickel, chromium, copper, silver, zinc, tin, indium, magnesium, zirconium, titanium, oxides thereof, and alloys thereof. The thickness of the inorganic-material thin film is preferably in the range of 30 nm to 3 µm. Examples of the topcoat layers include clear coatings formed with an acrylic lacquer paint, an acrylic melamine curable paint, an aluminum chelate-type acrylic paint, or an active-energy-ray-curable paint, and an SiOx layer formed by a plasma polymerization method. When the topcoat layer is a clear coating, the thickness is preferably in the range of 3 to 40 µm. Alternatively, when the topcoat layer is an SiOx layer, the thickness is preferably in the range of 30 to 300 nm.

Examples of molded bodies obtained in this manner include a reflecting mirror of an exterior lamp for car, various package materials, and electronic or electric members. The use of the active-energy-ray-curable resin composition of the present invention as an undercoat layer for an inorganic-material thin film provides a molded body superior in metallic luster of the inorganic-material thin film, adhesion to substrates, and heat resistance. In addition, the active-energy-ray-curable resin composition of the present invention is also characterized by superior storage stability.

EXAMPLES

The present invention will be described in detail below with reference to specific synthetic examples and working examples. Hereinafter, unless otherwise specified, "parts" and "%" are by weight.

In the examples of the present application, number average molecular weights (Mn), weight average molecular weights (Mw), and molecular weight distributions (Mw/Mn) were measured by gel permeation chromatography (GPC) under the following conditions.

Measurement apparatus: HLC-8320GPC from Tosoh Corporation
Column: TSK gel 4000HXL, TSK gel 3000HXL, TSK gel 2000HXL, and TSK gel 1000HXL, from Tosoh Corporation
Detector: refractive index detector (RI)
Data processing; Multistation GPC-8020 model II from Tosoh Corporation,
Measurement conditions
Column temperature: 40° C.
Solvent: tetrahydrofuran
Flow rate: 0.35 ml/min
Standard: monodispersed polystyrenes
Sample: a 0.2% tetrahydrofuran solution in terms of resin solid filtered through a microfilter (100 µl)

Production Example 1: Production of Acrylic-Modified Alkyd Resin (1)

Into a flask equipped with a stirrer, a temperature sensor, a condenser, and a dropping funnel were put 420 parts by mass of dehydrated castor oil fatty acid and 486 parts by mass of industrial xylene. While allowing dry nitrogen to flow in the flask, the mixture was stirred and heated to 130° C. Next, a mixed solution of 305 parts by mass of isobutyl methacrylate, 255 parts by mass of methacrylic acid, 203 parts by mass of styrene, 38 parts by mass of tert-butyl peroxybenzoate ("perbutyl Z" from NOF Corporation), and 38 parts by mass of industrial xylene was added dropwise from the dropping funnel over 3 hours. The resulting mixture was further stirred at 130° C. for 2 hours, and after confirmation that the viscosity was no more changed, the mixture was cooled to 60° C. Methyl ethyl ketone was added to dilute the mixture so that the resin solid content became 60% by mass, thereby obtaining an acrylic resin intermediate (X-1) solution. The acrylic resin intermediate (A-1) had an oil length of 35, an acid value of 205.1 mg KOH/g, a number average molecular weight (Mn) of 1,400, and a weight average molecular weight (Mw) of 7,000.

Into a flask equipped with a stirrer bar, a temperature sensor, and a rectifying tube were put 388 parts by mass of tall oil fatty acid, 840 parts by mass of linseed oil, 477 parts by mass of pentaerythritol, 17 parts by mass of p-tert-butylbenzoic acid, 103 parts by mass of polyoxyethylene glycol ("PEG#4000" from NOF Corporation), 759 parts by mass of phthalic anhydride, and 0.2 parts by mass of lithium hydroxide. While allowing dry nitrogen to flow in the flask, the mixture was stirred, heated to 210 to 230° C., and reacted. The reaction was stopped when the acid value became 33.3 mg KOH/g, obtaining an alkyd resin intermediate (B-1) which had an oil length of 46, a hydroxy group value of 81.0 mg KOH/g, a number average molecular weight (Mn) of 1,900, and a weight average molecular weight (Mw) of 13,800.

After the alkyd resin intermediate (B-1) obtained above was cooled to 80° C., 1970 parts by mass of the acrylic resin intermediate (A-1) solution was added thereto and the mixture was heated to 160° C., the solvent was removed under reduced pressure, and then the resultant was heated to 200° C. and was reacted for 3 hours. After cooling to 80° C., methyl ethyl ketone was added to dilute the reaction mixture into a resin solid content of 70% by mass, thereby obtaining an acrylic-modified alkyd resin (1) solution. The acrylic-modified alkyd resin (1) had an oil length of 45, an acid value of 62.3 mg KOH/g, a number average molecular weight (Mn) of 1,600, and a weight average molecular weight (Mw) of 86,100.

Example 1: Production of (Meth)Acryloyl Group-Containing Acrylic-Modified Alkyd Resin (1)

Into a flask equipped with a stirrer, a temperature sensor, and a condenser were put 65.5 parts by mass of isophorone diisocyanate, 0.1 parts by mass of 2,6-di-tert-butyl-4-methylphenol ("BHT Swanox" from Seiko Chemical Co., Ltd.), 0.01 parts by mass of methoquinone, and 0.01 parts by mass of an urethanization catalyst ("Neostann U-830" from Nittoh Chemical Co., Ltd.). While allowing dry nitrogen to flow in the flask, the mixture was stirred and heated to 60° C. Next, 34.5 parts by mass of 2-hydroxyethyl acrylate was put, and the mixture was heated to 70 to 90° C. and was reacted. When the content of isocyanate groups became 12.3% by mass, 2320 parts by mass of the acrylic-modified alkyd resin (1) solution (resin solid content: 70% by mass) was put and reacted. When the content of NCO isocyanate groups became 0.05% by mass or less, cooling was started, methyl ethyl ketone was added to dilute the reaction mixture into a resin solid content of 70% by mass, thereby obtaining a (meth)acryloyl group-containing acrylic-modified alkyd resin (1) solution. The (meth)acryloyl group-containing acrylic-modified alkyd resin (1) had an oil length of 43, an acid value of 60.6 mg KOH/g, a number average molecular weight (Mn) of 2,200, and a weight average molecular weight (Mw) of 126,000.

Example 2: Production of (Meth)Acryloyl Group-Containing Acrylic-Modified Alkyd Resin (2)

Into a flask equipped with a stirrer, a temperature sensor, and a condenser were put 31.6 parts by mass of isophorone diisocyanate, 0.1 parts by mass of 2,6-di-tert-butyl-4-methylphenol ("BHT Swanox" from Seiko Chemical Co., Ltd.), 0.01 parts by mass of methoquinone, and 0.01 parts by mass of an urethanization catalyst ("Neostann U-830" from Nittoh Chemical Co., Ltd.), and while allowing dry nitrogen to flow in the flask, the mixture was stirred and heated to 60° C. Next, 68.4 parts by mass of "Aronix M-305" (a mixture of pentaerythritol triacrylate and pentaerythritol tetraacrylate, hydroxy group value: 117 mg KOH/g) from Toagosei Co., Ltd. was put, and the mixture was heated to 70 to 90° C. and was reacted. When the content of isocyanate groups became 5.96% by mass, 2125 parts by mass of the acrylic-modified alkyd resin (1) solution (resin solid content: 70% by mass) was put and reacted. When the content of isocyanate groups became 0.05% by mass or less, cooling was started, methyl ethyl ketone was added to dilute the reaction mixture into a resin solid content of 70% by mass, thereby obtaining a (meth)acryloyl group-containing acrylic-modified alkyd resin (2) solution. The (meth)acryloyl group-containing acrylic-modified alkyd resin (2) had an oil length of 42, an acid value of 58.5 mg KOH/g, a number average molecular weight (Mn) of 2,400, and a weight average molecular weight (Mw) of 145,000.

Into a flask equipped with a stirrer, a temperature sensor, and a condenser, 714 parts by mass of the (meth)acryloyl group-containing acrylic-modified alkyd resin (2) solution was put and heated to 50° C. After 52.8 parts by mass of triethylamine was put, while cooling the mixture to room temperature, 952 parts by mass of ion exchange water was added dropwise over 3 hours. The organic solvent was removed by distillation under reduced pressure and ion exchange water was added to obtain a (meth)acryloyl group-containing acrylic-modified alkyd resin (2) aqueous dispersion having a resin solid content of 30% by mass.

Example 3: Production of (Meth)Acryloyl Group-Containing Acrylic-Modified Alkyd Resin (3)

Into a flask equipped with a stirrer, a temperature sensor, and a condenser were put 666 parts by mass of the acrylic-modified alkyd resin (1) solution (resin solid content: 70% by mass), 33.7 parts by mass of 2-isocyanatoethyl acrylate ("Karenz AOI" from Showa Denko K. K.), and 0.05 parts by mass of an urethanization catalyst ("Neostann U-830" from Nittoh Chemical Co., Ltd.). While allowing dry nitrogen to flow in the flask, the mixture was stirred, heated to 70 to 90° C., and reacted. When the content of isocyanate groups became 0.05% by mass or less, cooling was started, and methyl ethyl ketone was added to dilute the reaction mixture into a resin solid content of 70% by mass, thereby obtaining a (meth)acryloyl group-containing acrylic-modified alkyd resin (3) solution. The (meth)acryloyl group-containing acrylic-modified alkyd resin (3) had an oil length of 42, an acid value of 51.7 mg KOH/g, a number average molecular weight (Mn) of 2,000, and a weight average molecular weight (Mw) of 91,200.

Example 4: Production of Active-Energy-Ray-Curable Resin Composition (1)

Into a flask equipped with a stirrer, a temperature sensor, and a condenser, 643 parts by mass of the (meth)acryloyl group-containing acrylic-modified alkyd resin (1) solution (resin solid content: 70% by mass) and 50 parts by mass of "Aronix M-350" from Toagosei Co., Ltd. (ethylene oxide-modified trimethylolpropane triacrylate) were put and heated to 50° C. After 49.2 parts by mass of triethylamine was put, while cooling the mixture to room temperature, 974 parts by mass of ion exchange water was added dropwise over 3 hours. The organic solvent was removed by distillation under reduced pressure and ion exchange water was added to obtain an active-energy-ray-curable resin composition (1) having a resin solid content of 30% by mass.

Example 5: Production of Active-Energy-Ray-Curable Resin Composition (2)

Into a flask equipped with a stirrer, a temperature sensor, and a condenser were put 357 parts by mass of the (meth)

acryloyl group-containing acrylic-modified alkyd resin (1) solution (resin solid content: 70% by mass), 50 parts by mass of "Aronix M-305" (a mixture of pentaerythritol triacrylate and pentaerythritol tetraacrylate, hydroxy group value: 117 mg KOH/g) from Toagosei Co., Ltd., and 200 parts by mass of "NK ester A-400" (polyethylene glycol diacrylate) from Shin-Nakamura Chemical Co., Ltd. While allowing dry nitrogen to flow in the flask, the mixture was stirred and heated to 50° C. After 28.1 parts by mass of triethylamine was put, while cooling the mixture to room temperature, 1059 parts by mass of ion exchange water was added dropwise over 3 hours. The organic solvent was removed by distillation under reduced pressure, ion exchange water was added to obtain an active-energy-ray-curable resin composition (2) having a resin solid content of 30% by mass.

Example 6: Production of
Active-Energy-Ray-Curable Resin Composition (3)

Into a flask equipped with a stirrer, a temperature sensor, and a condenser, 357 parts by mass of the (meth)acryloyl group-containing acrylic-modified alkyd resin (2) solution (resin solid content: 70% by mass), 50 parts by mass of "Aronix M-305" (a mixture of pentaerythritol triacrylate and pentaerythritol tetraacrylate, hydroxy group value: 117 mg KOH/g) from Toagosei Co., Ltd. and 200 parts by mass of "NK ester A-400" (polyethylene glycol diacrylate) from Shin-Nakamura Chemical Co., Ltd were put and the mixture was heated to 50° C. After 26.4 parts by mass of triethylamine was put, while cooling the mixture to room temperature, 1060 parts by mass of ion exchange water was added dropwise over 3 hours. The organic solvent was removed by distillation under reduced pressure and ion exchange water was added to obtain an active-energy-ray-curable resin composition (3) having a resin solid content of 30% by mass.

Example 7: Production of
Active-Energy-Ray-Curable Resin Composition (4)

Into a flask equipped with a stirrer, a temperature sensor, and a condenser, 357 parts by mass of the (meth)acryloyl group-containing acrylic-modified alkyd resin (2) solution (resin solid content: 70% by mass), 50 parts by mass of "Aronix M-305" (a mixture of pentaerythritol triacrylate and pentaerythritol tetraacrylate, hydroxy group value: 117 mg KOH/g) from Toagosei Co., Ltd., 100 parts by mass of "NK ester A-400" (polyethylene glycol diacrylate) from Shin-Nakamura Chemical Co., Ltd., and 100 parts by mass of "NK ester A-GLY-9E" (ethylene oxide-modified glycerol triacrylate) from Shin-Nakamura Chemical Co., Ltd. were put and heated to 50° C. After 26.4 parts by mass of triethylamine was put, while cooling the mixture to room temperature, 1060 parts by mass of ion exchange water was added dropwise over 3 hours. The organic solvent was removed by distillation under reduced pressure and ion exchange water was added to obtain an active-energy-ray-curable resin composition (4) having a resin solid content of 30% by mass.

Example 8: Production of
Active-Energy-Ray-Curable Resin Composition (5)

Into a flask equipped with a stirrer, a temperature sensor, and a condenser, 357 parts by mass of the (meth)acryloyl group-containing acrylic-modified alkyd resin (2) solution (resin solid content: 70% by mass), 50 parts by mass of "Aronix M-305" (a mixture of pentaerythritol triacrylate and pentaerythritol tetraacrylate, hydroxy group value: 117 mg KOH/g) from Toagosei Co., Ltd., and 200 parts by mass of "NK ester A-400" (polyethylene glycol diacrylate) from Shin-Nakamura Chemical Co., Ltd were put and heated to 50° C. After 40.7 parts by mass of dimethylaminopropylacrylamide was put, while cooling the mixture to room temperature, 1060 parts by mass of ion exchange water was added dropwise over 3 hours. The organic solvent was removed by distillation under reduced pressure and ion exchange water was added to obtain an active-energy-ray-curable resin composition (5) having a resin solid content of 30% by mass.

Example 9: Production of
Active-Energy-Ray-Curable Resin Composition (6)

Into a flask equipped with a stirrer, a temperature sensor, and a condenser, 357 parts by mass of the (meth)acryloyl group-containing acrylic-modified alkyd resin (3) solution (resin solid content: 70% by mass), 50 parts by mass of "Aronix M-305" (a mixture of pentaerythritol triacrylate and pentaerythritol tetraacrylate, hydroxy group value: 117 mg KOH/g) from Toagosei Co., Ltd., and 200 parts by mass of "NK ester A-400" (polyethylene glycol diacrylate) from Shin-Nakamura Chemical Co., Ltd were put and heated to 50° C. After 23.3 parts by mass of triethylamine was put, while cooling the mixture to room temperature, 1060 parts by mass of ion exchange water was added dropwise over 3 hours. The organic solvent was removed by distillation under reduced pressure and ion exchange water was added to obtain an active-energy-ray-curable resin composition (6) having a resin solid content of 30% by mass.

Production Example 2: Production of
(Meth)Acryloyl Group-Containing Compound (R-1)
Aqueous Dispersion Into a pressure flask equipped with a stirrer, a temperature sensor, a condenser, and a dropping funnel, 1076 parts by mass of methyl ethyl ketone were put and heated under pressure to 90° C. A mixed solution of 850 parts by mass of methyl methacrylate, 200 parts by mass of 2-hydroxyethyl acrylate, 912 parts by mass of methoxypolyethylene glycol acrylate ("NK ester AM-130G" from Shin-Nakamura Chemical Co., Ltd.), 150 parts by mass of methacrylic acid, and 8.0 parts by mass of tert-butyl(2-ethylhexanoyl) peroxide ("perbutyl O" from NOF Corporation) was added dropwise from the dropping funnel over 4 hours. After completion of the addition, 1.0 parts by mass of di-tert-butylperoxide ("perbutyl D" from NOF Corporation) was put and reacted at 120° C. under pressure for 3 hours, thereby obtaining an intermediate which has a weight average molecular weight (Mw) of 12,400, an acid value of 13 mg KOH/g, and a hydroxy group value of 48 mg KOH/g.

Into a flask equipped with a stirrer, a temperature sensor, and a condenser, 66 parts by mass of isophorone diisocyanate, 1.0 part by mass of 2,6-di-tert-butyl-4-methylphenol ("BHT Swanox" from Seiko Chemical Co., Ltd.), 0.1 parts by mass of methoquinone, and 0.02 parts by mass of an urethanization catalyst ("Neostann U-830" from Nittoh Chemical Co., Ltd.) were put, and while allowing dry nitrogen to flow in the flask, the mixture was stirred and heated to 60° C. Next, 241 parts by mass of "Aronix M-305" (a mixture of pentaerythritol triacrylate and pentaerythritol tetraacrylate, hydroxy group value: 117 mg KOH/g) from Toagosei Co., Ltd. was put, and the mixture was heated to 70 to 90° C. and was reacted. When the content of isocyanate groups became 1 to 1.2% by mass, 160 parts by mass of the intermediate obtained above was put and further reacted. When the content of isocyanate groups became 0.10% or less, cooling was started and continued to 50° C. After 2.0 parts by mass of triethylamine was put, while cooling the mixture to room temperature, 550 parts by mass of ion exchange water was added dropwise over 3 hours. The organic solvent was removed by distillation under reduced pressure and ion exchange water was added to obtain a (meth)acryloyl group-containing compound (R-1) aqueous dispersion having a resin solid content of 40% by mass.

Examples 10 to 26

Components were blended at a ratio as shown in Tables 1 to 3 and ion exchange water was appropriately added to adjust the resin solid content to 30% by mass, thereby producing an active-energy-ray-curable resin composition.

Details of the components in Tables 1 to 3 areas follows.
(Meth)acryloyl group-containing compound (R-2): "Aronix M-403" (mixture of dipentaerythritol pentaacrylate and dipentaerythritol hexaacrylate, hydroxy group value: 75 mg KOH/g) from Toagosei Co., Ltd.
(Meth)acryloyl group-containing compound (R-3): "Aronix M-305" (a mixture of pentaerythritol triacrylate and pentaerythritol tetraacrylate, hydroxy group value: 117 mg KOH/g) from Toagosei Co., Ltd.
(Meth)acryloyl group-containing compound (R-4): "Miramer M220" (tripropylene glycol diacrylate) from MIWON
(Meth)acryloyl group-containing compound (R-5): "NK ester A-400" (polyethylene glycol diacrylate) from Shin-Nakamura Chemical Co., Ltd.
(Meth)acryloyl group-containing compound (R-6): "NK ester A-GLY-9E" (ethylene oxide-modified glycerol triacrylate) from Shin-Nakamura Chemical Co., Ltd.
Polycarbodiimide resin (1): "Carbodilite V-02-L2" from Nisshinbo Chemical Inc.
Polycarbodiimide resin (2): "Elastostab H01" from Nisshinbo Chemical Inc.
Oxazoline group-containing resin (1): "Epocros WS-500" from Nippon Shokubai Co., Ltd.
Oxazoline group-containing resin (2): "Epocros WS-700" from Nippon Shokubai Co., Ltd.
Photoinitiator: "IRGACURE 500" from BASF Japan Ltd.
Fluorine-based additive: "MEGAFACE F-477" from DIC Corporation
Silicone-based additive: "BYK-345" from BYK Additives & Instruments Production of Reflector The active-energy-ray-curable resin compositions obtained above were each applied on a plastic substrate by air spray coating. After drying at 80° C. for 10 minutes, the coating was irradiated with ultraviolet rays at 1500 mJ/cm$^2$ using a 80-W/cm high-pressure mercury lamp to form an undercoat layer. The undercoat layer had a thickness in the range of 15 to 25 μm. Next, an aluminum deposition layer of 100-nm thickness was formed on the surface of the undercoat layer using a vacuum deposition device, thereby producing a reflector. As the plastic substrate, the following three types were used and were referred to as reflectors 1 to 3, respectively.

Reflector 1: a polyphenylene sulfide (PPS) plate was used as a substrate.
Reflector 2: a bulk molding compound (BMC) plate was used as a substrate.
Reflector 3: an acrylonitrile-butadiene-styrene copolymer resin (ABS) plate was used as a substrate.

Production of Coated Plate

The active-energy-ray-curable resin compositions obtained above were each applied on a polycarbonate substrate by air spray coating. After drying at 80° C. for 10 minutes, the coating was irradiated with ultraviolet rays at 1500 mJ/cm$^2$ using a 80-W/cm high-pressure mercury lamp to form a coating layer. The coating layer had a thickness in the range of 15 to 25 μm.

Initial Evaluation of Reflector: Appearance

The appearance of the reflector 3 was evaluated according to the following criteria. The results are shown in Tables 1 to 3.
"A": Smooth with no"whitening", "rainbow", "crack", "blister" or other appearance defects observed.
"B": "Whitening", "rainbow", "crack", "blister" or other appearance defects observed in only part of reflector
"C": "Whitening", "rainbow", "crack", "blister" or other appearance defects observed in the whole of reflector.

Initial Evaluation of Reflector: Adhesion to Substrates

The adhesion to substrates of the reflectors 1 to 3 was evaluated by the following method. The results are shown in Tables 1 to 3.

The deposition layer side of each of the reflectors 1 to 3 was cut with a cutter knife at intervals of 2 mm into a 10×10 grid pattern to produce 100 squares of 4 mm$^2$. Next, a test was carried out in which scotch tape was attached to the grid and then quickly peeled, and the adhesion to substrates was evaluated according to an example of ASTM D3359.

In addition, for the reflector 1, the adhesion to substrates after allowed to stand in a hot air drier at 230° C. for 24 hours was similarly evaluated. For the reflector 3, the adhesion to substrates after allowed to stand in a hot air drier at 80° C. for 24 hours was similarly evaluated.
"5B": Peeled area after test of 0%.
"4B": Peeled area after test of less than 5%.
"3B": Peeled area after test of 5 or more and less than 15%.
"2B": Peeled area after test of 15 or more and less than 35%.
"1B": Peeled area after test of 35 or more and less than 65%.
"0B": Peeled area after test of 65% or more.

TABLE 1

|  | Example 10 | Example 11 | Example 12 | Example 13 | Example 14 | Example 15 |
|---|---|---|---|---|---|---|
| Active-energy-ray-curable resin composition (5) [part by mass (in terms of resin solid)] | 100 | 90 | 90 | 90 | 90 |  |
| (Meth)acryloyl-group containing acrylic-modified alkyd resin (2) solution [part by mass (in terms of resin solid)] |  |  |  |  |  | 50 |
| (Meth)acryloyl-group containing compound (R-2) [parts by mass] |  |  |  |  |  | 5 |

TABLE 1-continued

|  | Example 10 | Example 11 | Example 12 | Example 13 | Example 14 | Example 15 |
|---|---|---|---|---|---|---|
| (Meth)acryloyl-group containing compound (R-3) [parts by mass] |  |  |  |  |  | 30 |
| (Meth)acryloyl-group containing compound (R-4) [parts by mass] |  |  |  |  |  | 15 |
| Polycarbodiimide resin (1) [part by mass (in terms of resin solid)] |  | 10 |  |  |  |  |
| Polycarbodiimide resin (2) [part by mass (in terms of resin solid)] |  |  | 10 |  |  |  |
| Oxazoline group-containing resin (1) [part by mass (in terms of resin solid)] |  |  |  | 10 |  |  |
| Oxazoline group-containing resin (2) [part by mass (in terms of resin solid)] |  |  |  |  | 10 |  |
| Photoinitiator [part by mass] | 4 | 4 | 4 | 4 | 4 | 4 |
| Fluorine-based additive [part by mass] |  |  |  |  |  | 0.3 |
| Silicone-based additive [part by mass] | 0.3 | 0.3 | 0.3 | 0.3 | 0.3 |  |
| Evaluation of appearance (reflector 3 - initial) | A | A | A | A | A | A |
| Adhesion to substrate (reflector 1 - initial) | 5B | 5B | 5B | 5B | 5B | 5B |
| Adhesion to substrate (reflector 2 - initial) | 5B | 5B | 5B | 5B | 5B | 5B |
| Adhesion to substrate (reflector 3 - initial) | 5B | 5B | 5B | 5B | 5B | 5B |

TABLE 2

|  | Example 16 | Example 17 | Example 18 | Example 19 | Example 20 | Example 21 |
|---|---|---|---|---|---|---|
| Active-energy-ray-curable resin composition (1) [part by mass (in terms of resin solid)] | 100 | 50 |  |  |  |  |
| Active-energy-ray-curable resin composition (2) [part by mass (in terms of resin solid)] |  |  | 100 |  |  |  |
| Active-energy-ray-curable resin composition (3) [part by mass (in terms of resin solid)] |  |  |  | 100 |  |  |
| Active-energy-ray-curable resin composition (4) [part by mass (in terms of resin solid)] |  |  |  |  | 100 |  |
| Active-energy-ray-curable resin composition (6) [part by mass (in terms of resin solid)] |  |  |  |  |  | 100 |
| (Meth)acryloyl-group containing compound (R-3) [parts by mass] |  | 10 |  |  |  |  |
| (Meth)acryloyl-group containing compound (R-5) [parts by mass] |  | 40 |  |  |  |  |
| Photoinitiator [part by mass] | 4 | 4 | 4 | 4 | 4 | 4 |
| Fluorine-based additive [part by mass] |  |  | 0.3 | 0.3 | 0.3 | 0.3 |
| Silicone-based additive [part by mass] | 0.3 | 0.3 |  |  |  |  |
| Evaluation of appearance (reflector 3 - initial) | A | B | A | A | A | A |
| Adhesion to substrate (reflector 1 - initial) | 5B | 5B | 5B | 5B | 5B | 5B |
| Adhesion to substrate (reflector 2 - initial) | 5B | 5B | 5B | 5B | 5B | 5B |
| Adhesion to substrate (reflector 3 - initial) | 5B | 5B | 5B | 5B | 5B | 5B |

TABLE 3

|  | Example 22 | Example 23 | Example 24 | Example 25 | Example 26 |
|---|---|---|---|---|---|
| Active-energy-ray-curable resin composition (1) [part by mass (in terms of resin solid)] |  |  |  | 50 |  |
| (Meth)acryloyl-group containing acrylic-modified alkyd resin (2) aqueous dispersion [part by mass (in terms of resin solid)] | 50 | 50 | 50 |  | 100 |
| (Meth)acryloyl-group containing compound (R-1) aqueous dispersion [parts by mass] | 50 |  |  |  |  |
| (Meth)acryloyl-group containing compound (R-3) [parts by mass] |  | 10 | 10 | 10 |  |
| (Meth)acryloyl-group containing compound (R-5) [parts by mass] |  | 40 | 20 | 20 |  |
| (Meth)acryloyl-group containing compound (R-6) [parts by mass] |  |  | 20 | 20 |  |
| Photoinitiator [part by mass] | 4 | 4 | 4 | 4 | 4 |
| Fluorine-based additive [part by mass] | 0.3 | 0.3 | 0.3 |  | 0.3 |

TABLE 3-continued

|  | Example 22 | Example 23 | Example 24 | Example 25 | Example 26 |
|---|---|---|---|---|---|
| Silicone-based additive [part by mass] |  |  |  | 0.3 |  |
| Evaluation of appearance (reflector 3-initial) | A | B | B | B | A |
| Adhesion to substrate (reflector 1-initial) | 5B | 5B | 5B | 5B | 5B |
| Adhesion to substrate (reflector 2-initial) | 5B | 5B | 5B | 5B | 5B |
| Adhesion to substrate (reflector 3-initial) | 5B | 5B | 5B | 5B | 5B |

Evaluation of Heat Resistance of Reflector: Appearance

For Examples 10 to 15, the appearance of the reflector 3 after allowed to stand in a hot air drier at 80° C. for 24 hours was similarly evaluated according to the following criteria. All the samples were rated as A.

"A": Smooth with no "whitening", "rainbow", "crack", "blister" or other appearance defects observed.

"B": "Whitening", "rainbow", "crack", "blister" or other appearance defects observed in only part of reflector "C": "Whitening", "rainbow", "crack", "blister" or other appearance defects observed in the whole of reflector.

Evaluation of heat resistance of reflector: adhesion to substrates

For Examples 10 to 24, the adhesion to substrates of reflectors 1 and 3 after a heat treatment was evaluated by the following method. The results are shown in Table 4.

A reflector was allowed to stand in a hot air drier at 230° C. for 24 hours to prepare a reflector 1 and a reflector was allowed to stand in a hot air drier at 80° C. for 24 hours to prepare a reflector 3.

The deposition layer side of each reflector was cut with a cutter knife at intervals of 2 mm into a 10×10 grid pattern to produce 100 squares of 4 mm². Next, a test was carried out in which scotch tape was attached to the grid and then quickly peeled, and the adhesion to substrates was evaluated according to an example of ASTM D3359.

"5B": Peeled area after test of 0%.
"4B": Peeled area after test of less than 5%.
"3B": Peeled area after test of 5 or more and less than 15%.
"2B": Peeled area after test of 15 or more and less than 35%.
"1B": Peeled area after test of 35 or more and less than 65%.
"0B": Peeled area after test of 65% or more.

TABLE 4

|  | Example 10 | Example 11 | Example 12 | Example 13 | Example 14 |
|---|---|---|---|---|---|
| Adhesion to substrate (reflector 1-230° C., 24 hours) | 3B | 5B | 5B | 4B | 3B |
| Adhesion to substrate (reflector 3-80° C., 24 hours) | 5B | 5B | 5B | 3B | 3B |

|  | Example 15 | Example 16 | Example 17 | Example 18 | Example 19 |
|---|---|---|---|---|---|
| Adhesion to substrate (reflector 1-230° C., 24 hours) | 5B | 4B | 2B | 2B | 2B |
| Adhesion to substrate (reflector 3-80° C., 24 hours) | 5B | 5B | 3B | 3B | 2B |

|  | Example 20 | Example 21 | Example 22 | Example 23 | Example 24 |
|---|---|---|---|---|---|
| Adhesion to substrate (reflector 1-230° C., 24 hours) | 4B | 3B | 4B | 2B | 3B |
| Adhesion to substrate (reflector 3-80° C., 24 hours) | 3B | 4B | 5B | 2B | 4B |

Evaluation of Acid Resistance of Coating

For Examples 10 to 15 and 17 to 25, a plastic container filled with a 1 N-aqueous sulfuric acid solution was placed on the coating layer on the coated plate and was allowed to stand in an environment at 25° C. for 24 hours, thereby performing an acid resistance test of the coating layer. The state of the coating layer after the test was visually observed to evaluate the acid resistance according to the following evaluation criteria. All the coated plates were rated as A.

"A": No change found in tested coating layer.
"B": Cloudiness or blister found in part of tested coating layer.
"C": Cloudiness or blister found in whole of tested coating layer.

Evaluation of Alkali Resistance of Coating

For Examples 10 to 15, a plastic container filled with a 0.1 N-aqueous sodium hydroxide solution was placed on the coating layer on each of the coated plates obtained above and was allowed to stand in an environment at 25° C. for 24 hours, thereby performing an alkali resistance test of the coating layer. The state of the coating layer after the test was visually observed to evaluate the alkali resistance according to the following evaluation criteria. The results are shown in Table 5.

"A": No change found in tested coating layer.
"B": Cloudiness or blister found in part of tested coating layer.
"C": Cloudiness or blister found in whole of tested coating layer.

TABLE 5

|  | Example 10 | Example 11 | Example 12 | Example 13 | Example 14 | Example 15 |
|---|---|---|---|---|---|---|
| Alkali resistance (coated plate) | B | A | A | B | B | A |

Evaluation of Solvent Resistance of Coating

For Examples 10 to 12, 14, 15, and 17 to 25, a rubbing test in which a felt impregnated with methyl ethyl ketone was reciprocated 10 times in a distance of 10 cm while pressing the felt onto the coating layer side of the coated plate at a load of 500 g. The haze values of the coated plate before and after the test were measured to evaluate the solvent resistance according to the following evaluation criteria. The results are shown in Table 6.

"A": difference in haze values before and after test of less than 1.

"B": difference in haze values before and after test of 1 or more and less than 3.

"C": difference in haze values before and after test of 3 or more.

TABLE 6

|  | Example 10 | Example 11 | Example 12 | Example 14 | Example 15 | Example 17 | Example 18 |
|---|---|---|---|---|---|---|---|
| Solvent resistance (coated plate) | B | A | B | B | A | B | B |

|  | Example 19 | Example 20 | Example 21 | Example 22 | Example 23 | Example 24 | Example 25 |
|---|---|---|---|---|---|---|---|
| Solvent resistance (coated plate) | B | B | B | B | B | B | A |

The invention claimed is:

1. A (meth)acryloyl group-containing acrylic-modified alkyd resin, which comprises a reaction product of an acrylic resin intermediate (A), an alkyd resin intermediate (B), a polyisocyanate compound (C), and a hydroxy group-containing (meth)acrylate compound (D) as starting materials;
wherein the acrylic resin intermediate (A) has an acid value in the range of 50 to 300 mg KOH/g and a weight average molecular weight (Mw) in the range of 1,000 to 50,000.

2. A (meth)acryloyl group-containing acrylic-modified alkyd resin, which comprises a reaction product of an acrylic resin intermediate (A), an alkyd resin intermediate (B), and an isocyanate group-containing (meth)acrylate compound (E) as starting materials;
wherein the acrylic resin intermediate (A) has an acid value in the range of 50 to 300 mg KOH/g and a weight average molecular weight (Mw) in the range of 1,000 to 50,000.

3. The (meth)acryloyl group-containing acrylic-modified alkyd resin according to claim 1, wherein the acrylic resin intermediate (A) has an oil length of 10 or more.

4. The (meth)acryloyl group-containing acrylic-modified alkyd resin according to claim 1, wherein the alkyd resin intermediate (B) has an oil length of 10 or more and a weight average molecular weight (Mw) in the range of 1,000 to 100,0000.

5. The (meth)acryloyl group-containing acrylic-modified alkyd resin according to claim 1, wherein the polyisocyanate compound (C) is a polyisocyanate compound having a ring structure in the molecular structure.

6. An active-energy-ray-curable resin composition comprising the (meth)acryloyl group-containing acrylic-modified alkyd resin according to claim 1.

7. An undercoat agent for an inorganic-material thin film, comprising the active-energy-ray-curable resin composition according to claim 6.

8. A coating film comprising a product made from the undercoat agent according to claim 7.

9. A molded body comprising an undercoat layer made from the undercoat agent according to claim 7.

10. The (meth)acryloyl group-containing acrylic-modified alkyd resin according to claim 2, wherein the acrylic resin intermediate (A) has an oil length of 10 or more.

11. The (meth)acryloyl group-containing acrylic-modified alkyd resin according to claim 2, wherein the alkyd resin intermediate (B) has an oil length of 10 or more and a weight average molecular weight (Mw) in the range of 1,000 to 100,0000.

12. An active-energy-ray-curable resin composition comprising the (meth)acryloyl group-containing acrylic-modified alkyd resin according to claim 2.

13. An undercoat agent for an inorganic-material thin film, comprising the active-energy-ray-curable resin composition according to claim 12.

14. A coating film comprising a product made from the undercoat agent according to claim 13.

15. A molded body comprising an undercoat layer made from the undercoat agent according to claim 13.

* * * * *